(12) United States Patent
Versaevel et al.

(10) Patent No.: US 12,180,891 B2
(45) Date of Patent: Dec. 31, 2024

(54) ACOUSTIC PANEL FOR A TURBINE ENGINE

(71) Applicant: SAFRAN NACELLES, Gonfreville-l'Orcher (FR)

(72) Inventors: Marc Versaevel, Moissy-Cramayel (FR); Bertrand Léon Marie Desjoyeaux, Moissy-Cramayel (FR); Pierre-Yves Gini, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/554,958

(22) PCT Filed: Apr. 11, 2022

(86) PCT No.: PCT/FR2022/050676
§ 371 (c)(1),
(2) Date: Oct. 11, 2023

(87) PCT Pub. No.: WO2022/219274
PCT Pub. Date: Oct. 20, 2022

(65) Prior Publication Data
US 2024/0191656 A1 Jun. 13, 2024

(30) Foreign Application Priority Data
Apr. 12, 2021 (FR) ...................................... 2103763

(51) Int. Cl.
*F02C 7/045* (2006.01)
(52) U.S. Cl.
CPC .................................. *F02C 7/045* (2013.01)

(58) Field of Classification Search
CPC ....... F02C 7/045; F04D 29/663; F04D 29/664
See application file for complete search history.

(56) References Cited

U.S. PATENT DOCUMENTS

| 2009/0123687 A1* | 5/2009 | Chakraborty | ........... E04C 2/365 156/280 |
| 2020/0200084 A1* | 6/2020 | Desjoyeaux | ............ B32B 15/04 |

FOREIGN PATENT DOCUMENTS

| FR | 2 815 900 A1 | 5/2002 |
| WO | 2019/043344 A1 | 3/2019 |

OTHER PUBLICATIONS

France Search Report and Written Opinion mailed Dec. 17, 2021, issued in Application No. FR2103763, filed Apr. 12, 2021, 6 pages.

(Continued)

*Primary Examiner* — Aaron R Eastman
(74) *Attorney, Agent, or Firm* — CHRISTENSEN O'CONNOR JOHNSON KINDNESS PLLC

(57) ABSTRACT

An acoustic panel for a turbine engine includes a first strip and a second strip each comprising an alternation of first ridges and second ridges connected by sidewalls. The first and second strips are joined to each other to form a plurality of cells, each delimited by a first ridge of the first strip and a first ridge of the second strip. A third strip is interposed between the first strip and the second strip and includes a first lateral wall bearing on the first strip The third strip further includes at least one tab that extends inside one of the cells and delimits all or part of a passage inside the associated cell.

11 Claims, 9 Drawing Sheets

(56) References Cited

OTHER PUBLICATIONS

International Search Report mailed Jul. 22, 2022, issued in corresponding International Application No. PCT/FR2022/050676, filed Apr. 11, 2022, 5 pages.
Written Opinion mailed Jul. 22, 2022, issued in corresponding International Application No. PCT/FR2022/050676, filed Apr. 11, 2022, 5 pages.

* cited by examiner

ACOUSTIC PANEL FOR A TURBINE ENGINE

FIELD OF THE DISCLOSURE

The present invention relates to an acoustic panel for a turbine engine. It also relates to a turbine engine nacelle comprising such an acoustic panel.

BACKGROUND

As shown in FIG. 1, a turbine engine 10 conventionally comprises a nacelle 11 in which an engine or a turbojet engine is accommodated. The nacelle of a turbine engine is commonly equipped with an acoustic panel 12 to limit the level of noise emitted by the engine or the turbojet engine.

Such an acoustic panel 12 absorbs noise according to the Helmholtz resonator principle. To this end, the acoustic panel generally includes a perforated front acoustic wall to enable the passage of sound waves, a rear wall and a cellular structure, comprising a plurality of cells, which is interposed between the front wall and the rear wall.

Each cell extends between the rear wall and the front acoustic wall according to a main direction propagation of the sound waves. The dimension of the cells between the front acoustic wall and the rear wall, in the main direction, allows determining the frequency of the sound waves for which the acoustic attenuation is maximum. Typically, the acoustic attenuation is maximum for the sound waves whose wavelength is equal to or close to four times the dimension of the cell in the main direction (the length being inversely proportional to the frequency of the sound waves). On the other hand, the acoustic attenuation is zero for the sound waves whose wavelength is equal or close to the dimension of the cell in the main direction.

Current turbine engines tends towards a geometry with a larger diameter, with rotating elements, like the fan, which are slower and which therefore produce a noise having a lower frequency. Thus, there is a need to increase the dimension of the cells, in the main direction, so that these enable an acoustic attenuation of noises having a lower frequency.

Nonetheless, the nacelle of turbine engines tends to become shorter and thinner so as to limit drag. Hence, the acoustic panels equipping the nacelle should have a reduced thickness, which limits sizing of the cells to effectively attenuate the low frequencies.

To solve this drawback, it is known to arrange obstacles 19 extending inside each cell 18 transversely to the main direction X as shown in FIG. 2. The sound waves then propagate in the cell following an "S"-like path which lengthens the distance covered by the sound waves in the cell 18. Thus, for a given cell dimension in the main direction X, such a cell 18 enables an acoustic attenuation of sound waves having a lower frequency. Thus, the thickness of an acoustic panel 12 comprising such cells 18 could be reduced while enabling an attenuation of low-frequency noises.

In general, an acoustic panel 12 comprising such cells 18 is made by a stack of pre-cut, bent plates, connected together and which have been expanded under the effect of a compressive load applied to the stack. Such acoustic panels 12 are not satisfactory to the extent that their manufacture is complex and that the obstacles inside the cells do not have a uniform geometry.

SUMMARY

The present invention improves the situation.

An acoustic panel for a turbine engine is provided, the acoustic panel comprising at least:
- a first strip and a second strip, corrugated, each comprising an alternation, according to a first direction, first ridges and second ridges connected by sidewalls, the first strip and the second strip being joined to each other according to a second direction transverse to the first direction, so as to form a plurality of cells each delimited, in the second direction, by a first ridge of the first strip and a first ridge of the second strip, each cell extending according to a third direction transverse to the first direction and to the second direction,
- a third strip interposed, in the second direction, between the first strip and the second strip, the third strip comprising a first lateral wall bearing, in the second direction, on the first strip, the third strip further comprising at least one tab which extends inside one of the cells, at least partially transversely to the third direction of the associated cell, the at least one tab being connected, at a first end edge in the second direction, to the first lateral wall, the at least a tab delimiting all or part of a passage in the third direction inside the associated cell.

The sound waves propagate inside the cell in the third direction. In other words, the third direction is a direction of propagation of the sound waves inside the cell. Thus, the first tab forms an obstacle to the propagation of sound waves in the cell, these being forced to propagate through the passage delimited by the first tab. The distance covered by the sound waves inside the associated cell is then increased. Thus, the dimension of the acoustic panel is reduced in the third dimension while maintaining an acoustic attenuation of the low frequencies. Furthermore, such a panel may be manufactured from preformed strips and does not require the application of stresses on the strips to form each obstacle inside a cell. Hence, such an acoustic panel has the advantage of being easy and quick to manufacture.

The first lateral wall may be fastened to the first strip and/or to the second strip, in particular by an adhesive. The at least one tab may be connected to the first lateral wall by a bend line. Also, the proper positioning and fastening of the third strip with respect to the first strip and to the second strip is simple to implement and allows for an identical geometry of the obstacles for all cells of the acoustic panel. The at least one tab may extend perpendicularly to the first lateral wall. The first strip and the second strip may form the plurality of cells in the first direction. The third strip may have a dimension, in the first direction, which is similar to the dimensions of the first strip and of the second strip in the first direction.

The first direction and the second direction may be coplanar. The second direction may be perpendicular to the first direction. The third direction may be perpendicular to the first direction and/or to the second direction. The second direction may be a direction normal to the ridges of the first strip and of the second strip.

The passage may be delimited by a free edge of the tab and one amongst the first ridge of the first strip and the first ridge of the second strip, delimiting the associated cell.

The passage may be delimited, in the second direction, by a free edge of the tab and one amongst the first ridge of the first strip and the first ridge of the second strip delimiting the associated cell.

Each cell may have a section transverse to the associated third direction which is hexagonal, and wherein the at least one tab comprises a central portion which extends, in the second direction, between the first ridges of the first strip of the second strip, which delimit the associated cell, and two lateral portions each extending, in the second direction, between sidewalls of the first strip and of the second strip, opposite one another in the second direction, which delimit the associated cell.

Thus, when each cell has a section transverse to the associated third direction which is hexagonal, it is ensured that the tab extends over the entire cross-section of the associated cell, with the exception of the passage delimited by the tab.

The central portion of the tab may extend transversely to the third direction of the associated cell. Each of the lateral portions of the tab may extend obliquely with respect to the third direction of the associated cell.

Each lateral portion may be connected to the central portion by a bend line.

The passage may be an opening with closed contours formed in the tab. A second end edge of the tab, in the second direction, may be contiguous with the first ridge of the second strip delimiting the associated cell.

The first lateral wall of the third strip may comprise an alternation, in the first direction, of first ridges and second ridges connected by sidewalls, each first ridge and second ridge of the first lateral wall respectively bearing, in the second direction, on one of the first ridges and one of the second ridges of the first strip. In other words, the first lateral wall may be complementarily joined to the first strip.

Each first ridge and second ridge of the first lateral wall may be connected to one of the adjacent sidewalls by a bend line.

The third strip may further comprise a second lateral wall bearing, according to the second direction, on the second strip, the at least one tab being connected, at a second end edge in the second direction, to the second lateral wall.

The second lateral wall may be fastened to the second strip, in particular by an adhesive.

The second lateral wall of the third strip may comprise an alternation, in the first direction, of first ridges and second ridges connected by sidewalls. Each first ridge and second ridge of the second lateral wall may respectively bear in the second direction on one of the first ridges and one of the second ridges of the second strip. The second lateral wall may be complementarily joined to the second strip.

Each first ridge and second ridge of the second lateral wall may be connected to one of the adjacent sidewalls by a bend line.

Each second ridge of the first lateral wall of the third strip and, where appropriate, each second ridge of the second lateral wall of the third strip, may be clamped in the second direction between one of the second ridges of the first strip and one of the second ridges of the second strip.

The third strip may comprise a plurality of tabs offset from each other in the third direction of the associated cell, and wherein the passages totally or partially delimited by consecutive first tab and second tab in the third direction are offset from each other in a direction transverse to the third direction of the associated cell.

In particular, the third strip may comprise a first tab and a second tab which are offset from each other in the third direction of the associated cell, the passage totally or partially delimited by the first tab and the passage totally or partially delimited by the second tab being offset with respect to each other in a direction transverse to the third direction of the associated cell. Thus, the propagation path of the sound waves in the cell forms a baffle or an "S"-like shape so as to increase the distance covered by the sound waves in the cell.

The second lateral wall may comprise a first portion connected to the first tab and a second portion connected to the second tab, the first portion and the second portion of the second lateral wall being discontinuous.

The third strip may comprise at least one tab associated with each cell formed by the first strip and the second strip.

The acoustic panel may further comprise at least one acoustically-permeable septum which extends inside one of the cells, transversely to the third direction of the associated cell. The septum may extend inside the passage totally or partially delimited by the at least one tab. The septum allows dividing the associated cell into two stages in the third direction. The septum may be a multi-perforated membrane to enable an acoustic communication between the stages. Such a septum enables an acoustic absorption over a wider frequency range. In general, such an acoustic panel is commonly called a two-stage acoustic panel (or "DDOF", standing for "Double Degree Of Freedom") in contrast with a single-stage acoustic panel (or "SDOF", standing for "Single Degree Of Freedom").

The first strip, the second strip and/or the third strip may be made of a metallic material, such as aluminum, or of a thermosetting material.

The first strip and/or the second strip may be obtained by stamping. The third strip may be obtained by bending.

According to another aspect, a turbine engine nacelle is described comprising at least an acoustic panel as described hereinbefore.

According to another aspect, a method is described for manufacturing an acoustic panel as described hereinbefore, comprising the steps of:
  i providing the corrugated first strip and second strip each comprising a plurality of first ridges and second ridges connected by sidewalls,
  ii providing the third strip comprising the at least one tab,
  iii positioning the first lateral wall of the third strip bearing on the first strip according to the second direction,
  iv joining the second strip to the first strip to form the plurality of cells, with the third strip interposed, in the second direction, between the first strip and the second strip, the at least one tab extending inside one of the cells.

Step i may comprise the following subsidiary steps:
  a1 providing a first strip and a second strip each having a planar shape,
  b1 forming the first strip and the second strip so that each has a corrugated shape with an alternation of first ridges and second ridges connected by sidewalls.

Step b1 may be carried out by stamping. The corrugated shape of the first strip and of the second strip may be obtained by passing the first strip and the second strip between two notched rolls.

Step i may further comprise a step c1 consisting in heating the first strip and the second strip, in particular when these are made of a thermosetting material. Each of the first strip and the second strip may be heated up to a stabilized state in which they are rigid.

The manufacturing method may further comprise a step v consisting in heating the acoustic panel, in particular when the first strip, the second strip and the third strip are made of a thermosetting material. Heating the strips enables a polymerization enabling fastening the strips together. Step v may be carried out with the strips arranged on a tooling having a curvature so as to confer a curvature on the strips.

The method may comprise a step ii' consisting in depositing an adhesive layer over each side of the third strip in the second direction. Step ii' may be carried out between step ii and step iii.

Alternatively, step v may consist in cross-linking each adhesive layer, in particular by heating the acoustic panel.

Step ii may include the subsidiary steps:
a2 providing a third strip having a planar shape,
b2 forming the bend lines delimiting each first ridge and second ridge of the first lateral wall and of the second lateral wall of the third strip,
c2 forming at least one pair of bend lines on the third strip, each bend line of the pair delimiting one of the end edges in the second direction of the at least one tab, the bend lines of the pair being joined at each first ridge of the first lateral wall and of the second lateral wall,
d2 making a cutout in the third strip forming the passage delimited totally or partially by the at least one tab,
e2 bending the first lateral wall and the second lateral wall so that each has a corrugated shape with an alternation of first ridges and second ridges connected by sidewalls,
f2 bending the at least one tab with respect to the first lateral wall,
g2 bending the second lateral wall with respect to the at least one tab and to the first lateral wall so that each second ridge of the second lateral wall is opposite one of the second ridges of the first lateral wall.

Where appropriate, step c2 may further consist in forming the bend line between the central portion of the at least one tab and each lateral portion.

Step d2 may be carried out by laser.

Steps e2, g2 and f2 may be carried out by a press brake, in particular a manual or automatic type press brake. In particular, the at least one tab may be bent at 90° with respect to the first lateral wall during step f2.

Step ii may further comprise a step h2 consisting in heating the third strip, in particular when the latter is made of a thermosetting material. The third strip may be heated up to a stabilized state in which it is rigid.

DESCRIPTION OF THE DRAWINGS

Other features, details and advantages will appear upon reading the detailed description hereinafter, and upon analyzing the appended drawings, wherein.

DETAILED DESCRIPTION

Figure 1:
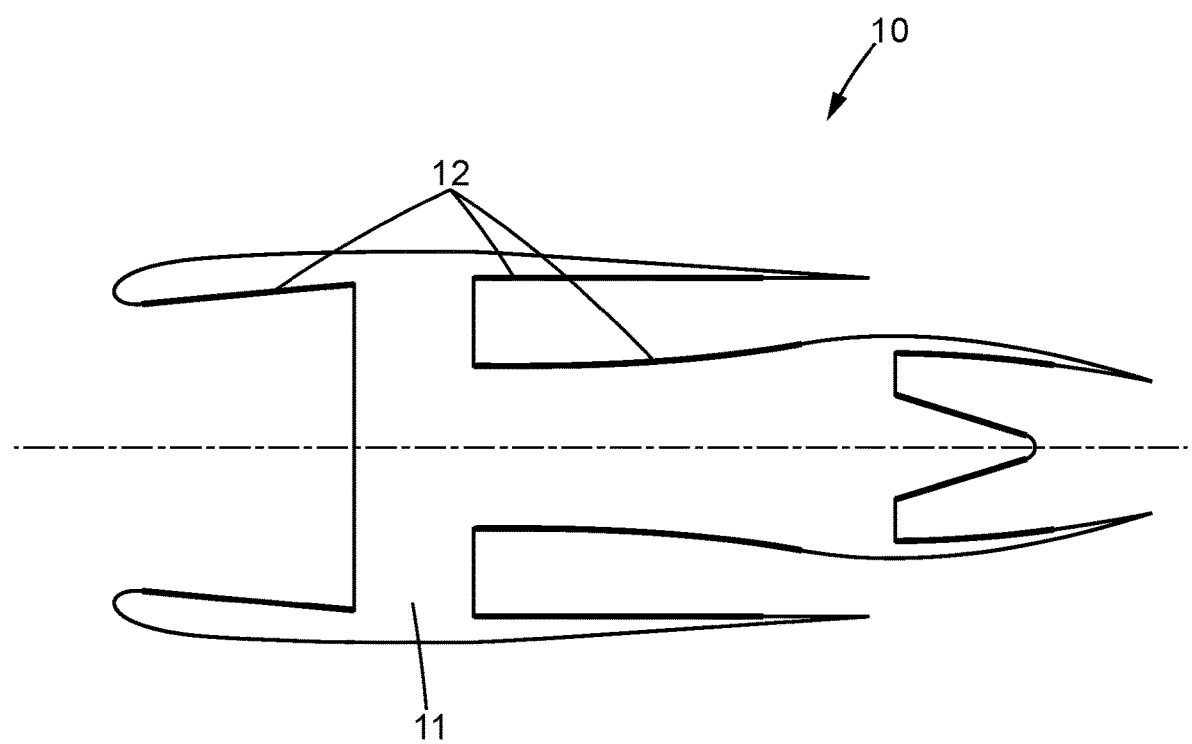
FIG. 1 is a partial axial sectional schematic of a turbine engine of the prior art.
Figure 2:
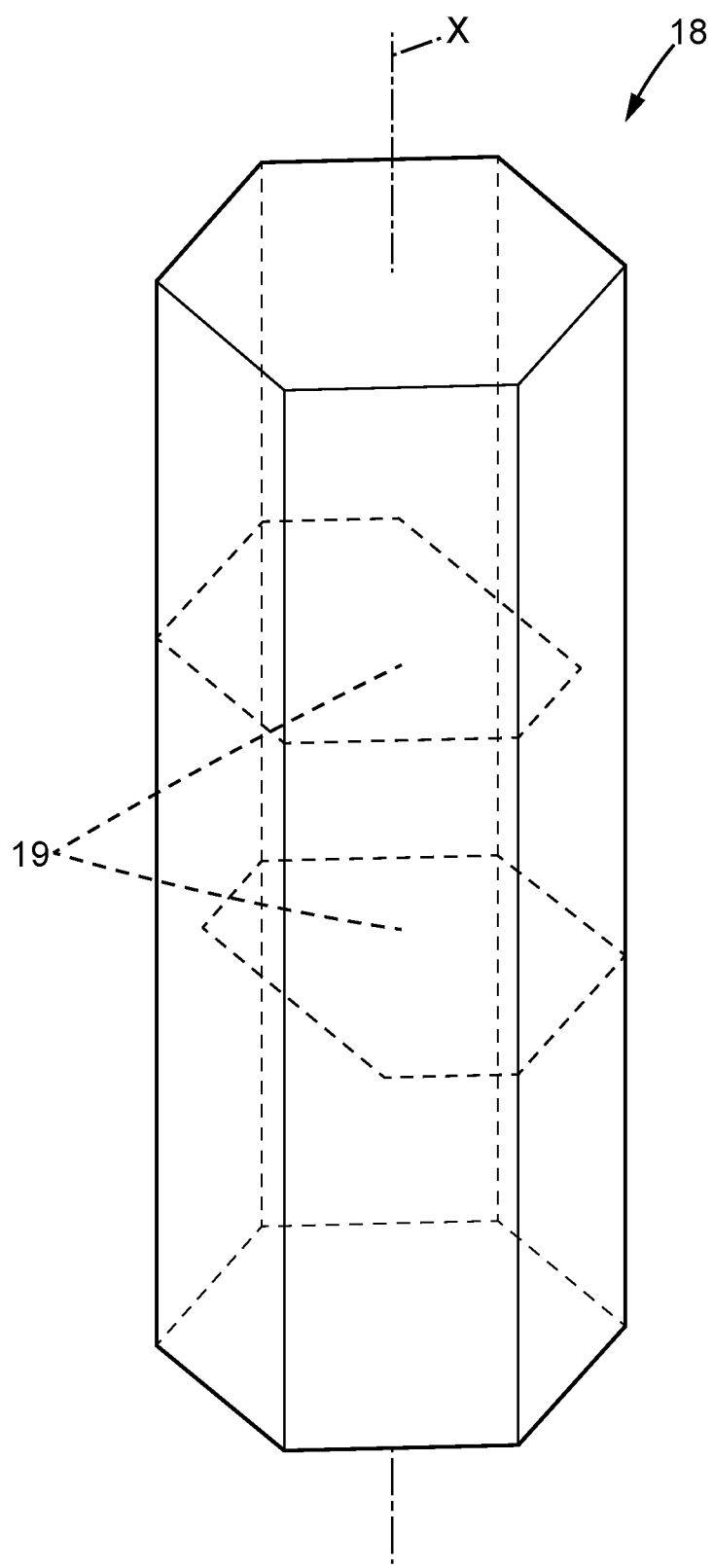
FIG. 2 is a partial perspective schematic of an acoustic panel cell of the prior art.
Figure 3:
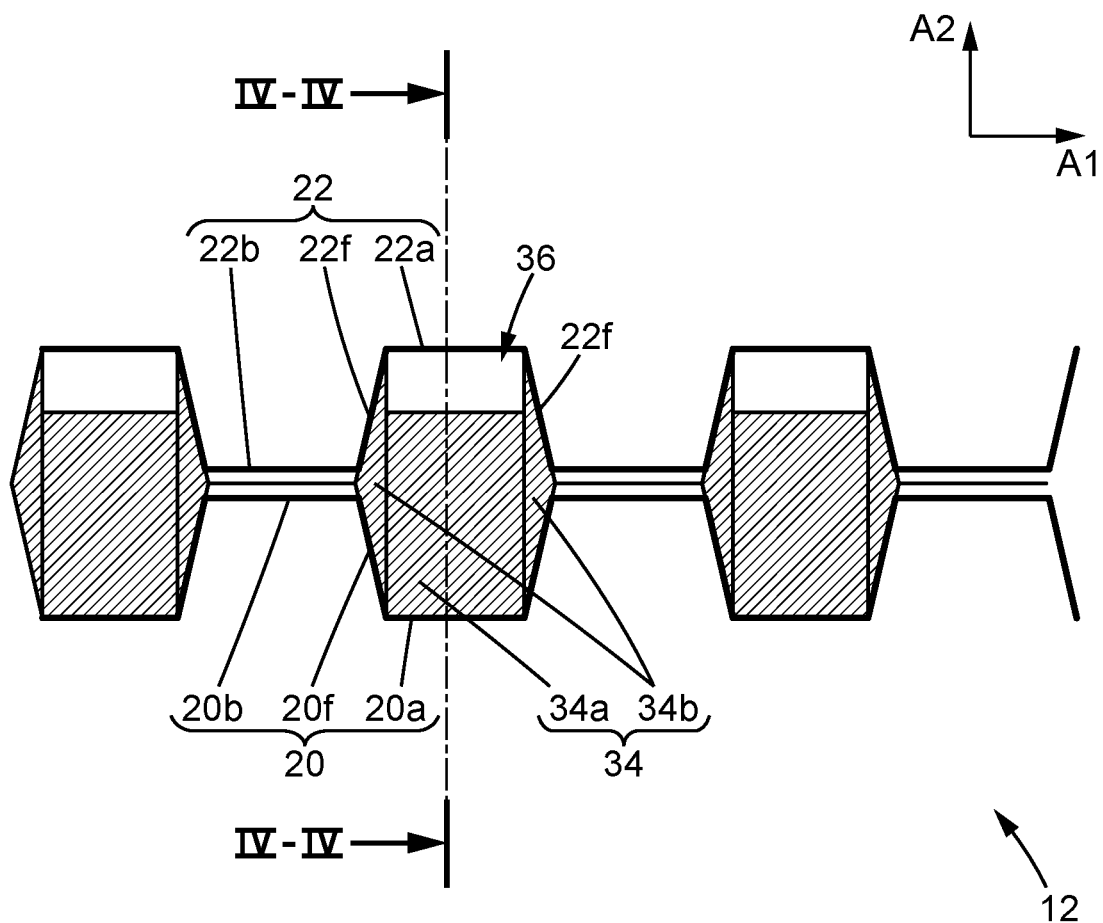
FIG. 3 is a partial schematic view of an acoustic panel according to the description.
Figure 4:
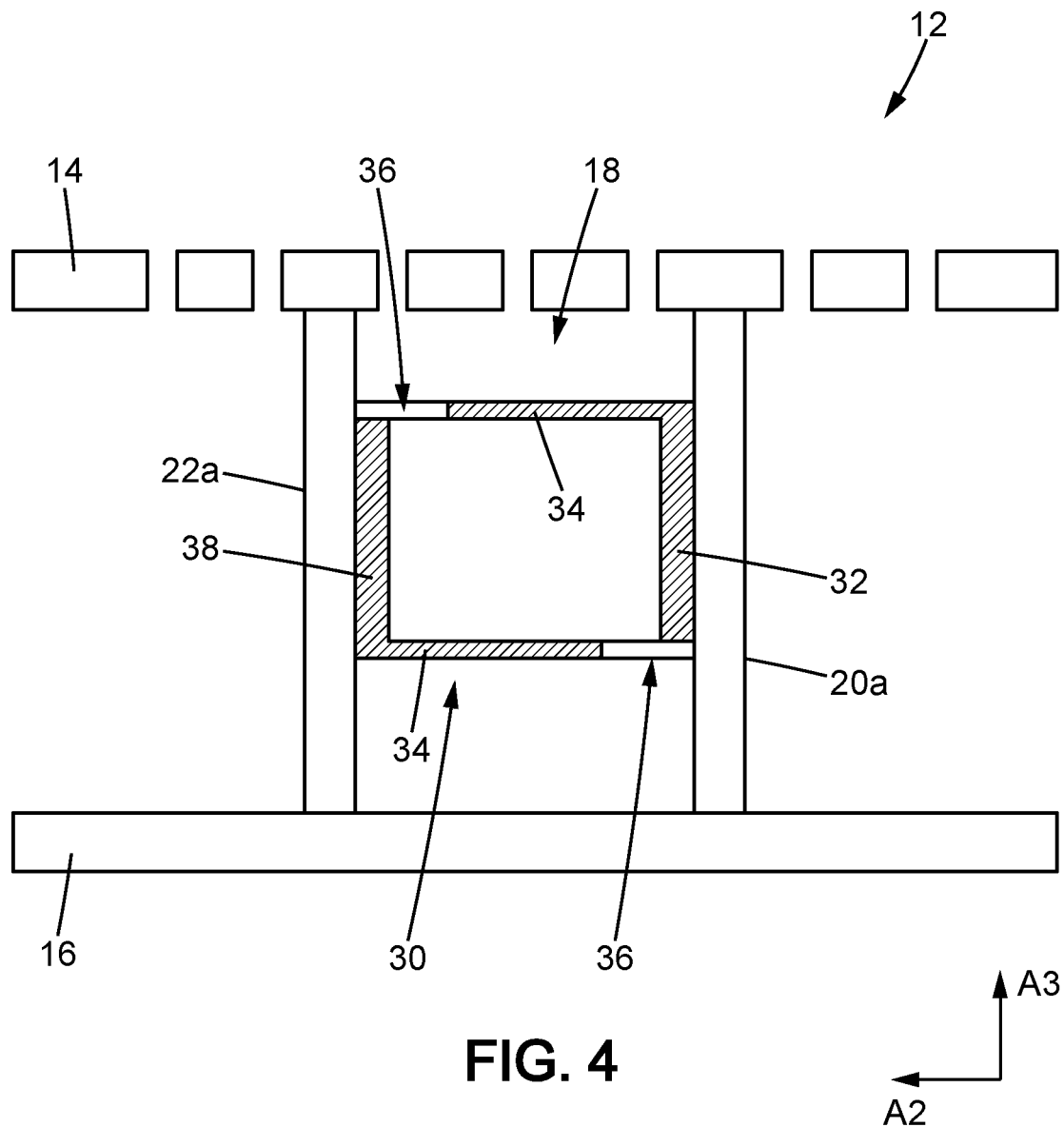
FIG. 4 is a partial schematic sectional view of the acoustic panel of FIG. 3.

Reference is now made to FIGS. 3 and 4 which show an acoustic panel 12 for a turbine engine. In particular, the acoustic panel 12 may equip a turbine engine nacelle. The acoustic panel 12 herein comprises an acoustic front wall 14 and a rear wall 16, each being visible in FIG. 4. The acoustic front wall 14 and the rear wall 16 are parallel to each other. The front wall and the rear wall are spaced apart and opposite each other in a main direction of the acoustic panel. The main direction of the acoustic panel is considered across the thickness of the acoustic panel. The front acoustic wall 14 is multi-perforated so as to be acoustically-permeable.

The acoustic panel comprises a first strip 20 and a second strip 22 arranged between the front wall 14 and the rear wall 16. Each of the first strip 20 and the second strip 22 herein extends in the main direction of the acoustic panel 12. Each of the first strip 20 and the second strip 22 is corrugated. Each of the first strip 20 and the second strip 22 comprises an alternation, according to a first direction A1, of first ridges 20a, 22a and second ridges 20b, 22b connected by sidewalls 20f, 22f. The first direction A1 may be transverse to the main direction of the acoustic panel. The first direction A1 is herein perpendicular to the main direction of the acoustic panel.

The first strip 20 and the second strip 22 are joined to each other (i.e. disposed on each other) according to a second direction A2 transverse to the first direction A1, so as to form a plurality of cells 18. The first strip 20 and the second strip 22 form the plurality of cells 18 in the first direction A1. In other words, the first strip 20 and the second strip 22 form a row of cells 18 in the first direction A1. The first direction A1 and the second direction A2 are coplanar. The second direction A2 is herein perpendicular to the first direction A1. The second direction A2 is a direction normal to each ridge 20a, 20b, 22a, 22b of the first strip 20 and of the second strip 22.

Each cell 18 is delimited in the main direction of the acoustic panel 12 by the rear wall 16 and the front wall 14. Each cell 18 is delimited, in the second direction A2, by a first ridge 20a of the first strip 20 and a first ridge 22a of the second strip 22. Each cell 18 extends according to an associated third direction A3 which is transverse to the first direction A1 and to the second direction A2. The sound waves propagate inside each cell according to the associated third direction A3. In other words, the third direction A3 of each cell 18 is a direction of propagation of the sound waves inside the cell 18. The third direction A3 is herein perpendicular to the first direction A1 and to the second direction A2. Also, the third direction A3 associated with each cell 18 coincides with the main direction of the acoustic panel 12. Each cell 18 has a section transverse to the associated third direction A3 which is hexagonal.

Figure 5:
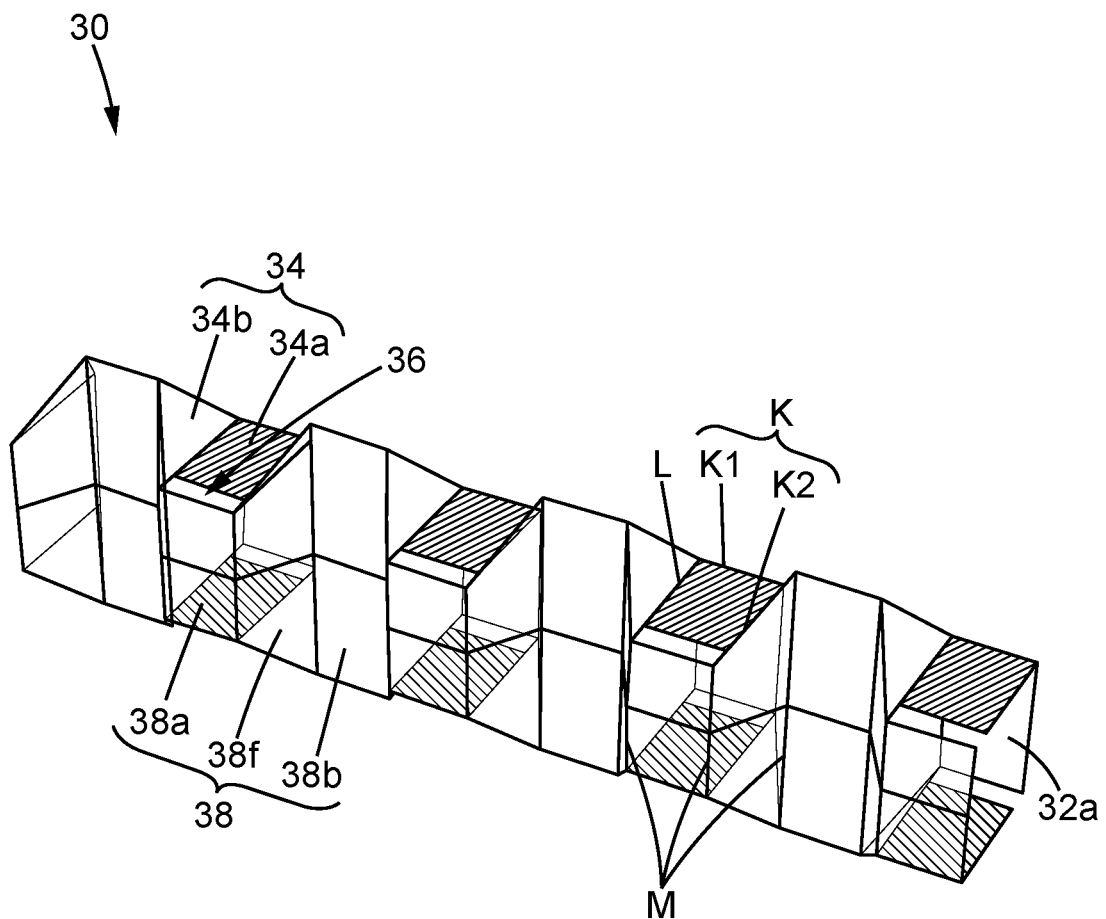
FIG. 5 is a schematic perspective view of the third strip of the acoustic panel of FIG. 3.
Figure 8:
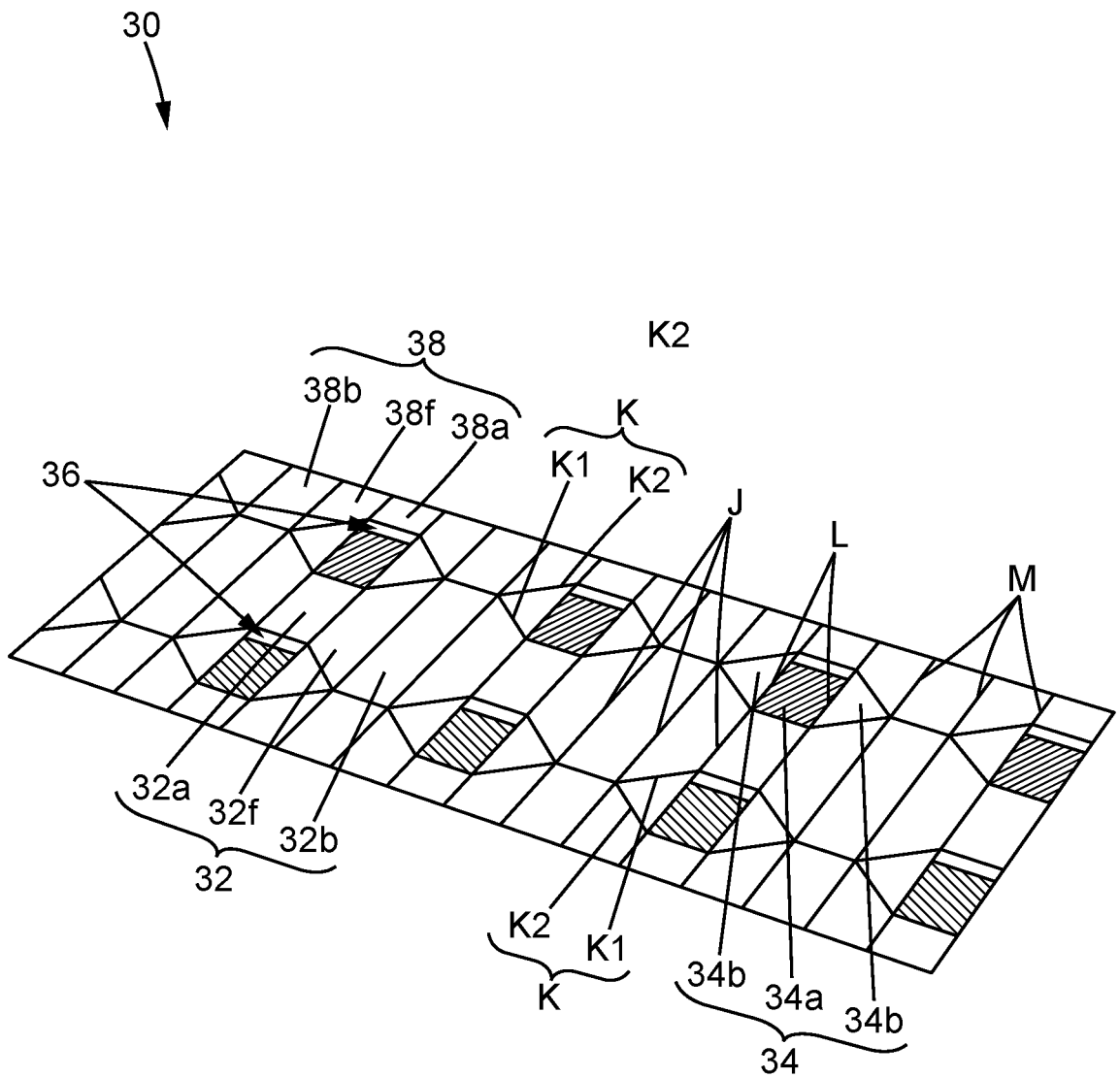
FIG. 8 is a schematic perspective view of the third strip of the acoustic panel of FIG. 5 before bending.

The acoustic panel 12 further comprises a third strip 30, visible more particularly in FIGS. 5, 8 and 9. The third strip 30 is interposed, in the second direction A2, between the first strip 20 and the second strip 22. The third strip 30 may have a dimension, in the first direction A1, which are similar to the dimensions of the first strip 20 and of the second strip 22 in the first direction A1.

The third strip 30 comprises a first lateral wall 32 bearing, in the second direction A2, on the first strip 20. The first lateral wall 32 of the third strip 30 comprises an alternation, in the first direction, of first ridges 32a and second ridges 32b connected by sidewalls 32f. Each first ridge 32a and second ridge 32b of the first lateral wall 32 respectively bears in the second direction A2 on one of the first ridges 20a and one of the second ridges 20b of the first strip 20. In other words, the first lateral wall 32 cooperates by form fitting with the first strip 20. Each first ridge 32a and second ridge 32b of the first lateral wall 32 is herein connected to one of the adjacent sidewalls 32f by a bend line J. The first lateral wall 32 of the third strip 30 is fastened to the first strip 20, for example by means of an adhesive.

The third strip 30 further comprises a first tab 34 and a second tab 34. The first tab 34 and the second tab 34 extend inside one of the cells 18, at least partially transversely to the third direction A3 of the associated cell 18. Each tab 34 is connected, at a first end edge in the second direction A2, to the first lateral wall 32. Each tab 34 is herein connected to the first lateral wall 32 by a bend line K1. Each tab 34 may extend perpendicular to the first lateral wall 32.

The first tab 34 and the second tab 34 are offset from each other in the third direction A3 of the associated cell. To this end, the first tab 34 is connected to a first end of the first lateral wall 32 according to the third direction A3. The second tab 34 is connected to a second end of the first lateral wall 32 according to the third direction A3. The third strip 30 may comprise a plurality of first tabs 34 and a plurality of second tabs 34, a first tab 34 and a second tab 34 being associated with each cell formed by the first strip 20 and the second strip 22.

Each tab 34 delimits all or part of a passage 36 in the third direction A3 inside the associated cell 18. The first tab 34 forms an obstacle to the propagation of sound waves in the cell 18. The sound waves are forced to propagate through the passage 36 totally or partially delimited by the first tab 34. The distance covered by the sound waves inside the associated cell 18 is then increased. Thus, attenuates sound waves having a lower frequency while keeping an acoustic panel 12 with a small thickness.

In particular, the passage 36 delimited, totally or partially, by the first tab 34 and the passage 36 delimited, totally or partially, by the second tab 34 are offset with respect to each other in the second direction A2 to the third direction A3 of the associated cell 18. Thus, the propagation path of the sound waves in the cell forms a baffle or an "S"-like shape so as to further increase the distance covered by the sound waves in the cell 18.

Each passage 36 is herein delimited, in the second direction A2, by a free edge of the associated tab 34 and one amongst the first ridge 20a of the first strip 20 and the first ridge 22a of the second strip 22 delimiting the associated cell 18. In particular, the passage 36 delimited by the first tab 34 is herein delimited, in the second direction A2, by a free edge of the first tab 34 and the first ridge 22a of the second strip 22. Similarly, the passage 36 delimited by the second tab 34 is herein delimited, in the second direction A2, by a free edge of the second tab 34 and the first ridge 20a of the first strip 20.

Each tab 34 comprises a central portion 34a which extends, in the second direction A2, between the first ridges 20a, 22a of the first strip 20 and of the second strip 22 which delimit the associated cell 18. The central portion 34a of the tab 34 extends transversely to the third direction A3 of the associated cell 18. Each tab 34 also comprises two lateral portions 34b on each side of the central portion 34a in the first direction A1. Each lateral portion 34b extends, in second direction A2, between sidewalls 20f, 22f of the first strip 20 and of the second strip 22 opposite each other in the second direction A2 and which delimit the associated cell 18. Each of the lateral portions 34b of the tab 34 extends obliquely with respect to the third direction A3 of the associated cell 18. Each lateral portion 34b is herein connected to the central portion 34a by a bend line L. Thus, when each cell 18 has a section transverse to the associated third direction A3 which is hexagonal, it is ensured that the tab 34 extends over the entire cross-section of the associated cell 18 to form an obstacle to the propagation of the sound waves, with the exception of the passage 36 delimited by the tab 34.

The third strip 30 further comprises a second lateral wall 38 bearing, according to the second direction A2, on the second strip 22. The second lateral wall 38 of the third strip 30 comprises an alternation, in the first direction A1, of first ridges 38a and second ridges 38b connected by sidewalls 38f. Each first ridge 38a and second ridge 38b of the second lateral wall 38 respectively bears, in the second direction A2, on one of the first ridges 22a and one of the second ridges 22b of the second strip 22. In other words, the second lateral wall 38 cooperates by form fitting with the second strip 22. Each first ridge 38a and second ridge 38b of the second lateral wall 38 is herein connected to one of the adjacent sidewalls by a bend line M. The second lateral wall 38 of the third strip 38 is fastened to the second strip 22, for example by means of an adhesive.

Each second ridge 38b of the second lateral wall 38 bears, in the second direction A2, against one of the second ridges 32b of the first lateral wall 32. Each second ridge 32b of the first lateral wall 32 of the third strip 30, and each second ridge 38b of the second lateral wall 38 of the third strip 30 is clamped, in the second direction A2, between one of the second ridges 20b of the first strip 20 and one of the second ridges 22b of the second strip 22.

Each of the first tab 34 and second tab 34 is connected, at a second end edge, in the second direction A2, to the second lateral wall 38. The first tab 34 is connected to a first end of the second lateral wall 38 according to the third direction A3. The second tab 34 is connected to a second end of the second lateral wall 38 according to the third direction A3. Each of the first tab 34 and second tab 34 is herein connected to the second lateral wall 38 by a bend line K2. The second lateral wall 38 herein comprises a first portion connected to the first tab 34 and a second portion connected to the second tab 34, the first portion and the second portion of the second lateral wall 38 being discontinuous.

The acoustic panel may further comprise at least one acoustically-permeable septum which extends inside the cell 18, transversely to the associated third direction A3. In particular, a septum may extend inside the passage 36 totally or partially delimited by each tab 34.

The first strip 20, the second strip 22 and/or the third strip 30 may be made of a metallic material, such as aluminum. Alternatively, the first strip 20, the second strip 22 and/or the third strip 30 may be made of a thermosetting material. According to a particular example, the first strip 20 and the second strip 22 are made of a metallic material and the third strip 30 is made of a thermosetting material. According to another particular example, all of the first strip 20, the second strip 22 and the third strip 30 are made of a thermosetting material.

As one could see in more detail hereinafter, the first strip 20, the second strip 22 and the third strip 30 may be preformed before being assembled to form the acoustic panel. The first strip 20 and the second strip 22 may be obtained by stamping. The third strip 30 may be obtained by bending. Thus, such a panel may be manufactured from preformed strips and does not require the application of compression loads on the strips to form each obstacle inside a cell. Hence, such an acoustic panel 12 has the advantage of being easy and quick to manufacture. Also, the proper positioning of each obstacle inside one of the cells is simpler to implement.

Figure 6:
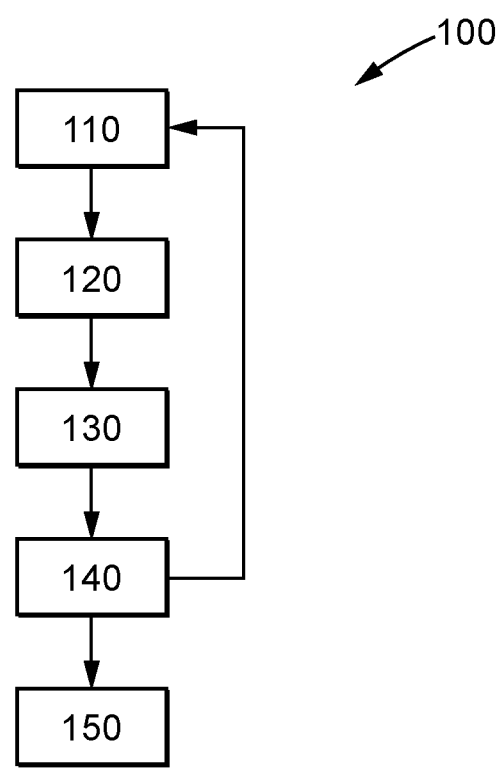
FIG. 6 is a flowchart of the method for manufacturing the acoustic panel of FIG. 3.

FIG. 6 shows a block diagram of a method 100 for manufacturing the acoustic panel 12 as described hereinbefore.

The method 100 includes a first step 110 consisting in providing the corrugated first strip 20 and second strip 22 each comprising a plurality of first ridges 20a, 22a and second ridges 20b, 22b connected by sidewalls. The first step 110 may comprise a first subsidiary sub-step consisting in providing a first strip 20 and a second strip 22 each having a planar shape. The first step may comprise a second subsidiary sub-step consisting in forming the first strip 20 and the second strip 22 so that each has a corrugated shape with an alternation of first ridges 20a, 22a and second ridges 20b, 22b connected by sidewalls 20f, 22f. The second subsidiary sub-step may be carried out by stamping. In other words, the corrugated shape of the first strip 20 and of the second strip 22 may be obtained by passing the first strip 20 and the second strip 22 between two notched rolls. The first step 110 may comprise a third subsidiary sub-step consisting in heating the first strip 20 and the second strip 22, in particular when these are made of a thermosetting material. In particular, each of the first strip 20 and the second strip 22 may be heated up to a stabilized state in which they are rigid.

Figure 7:
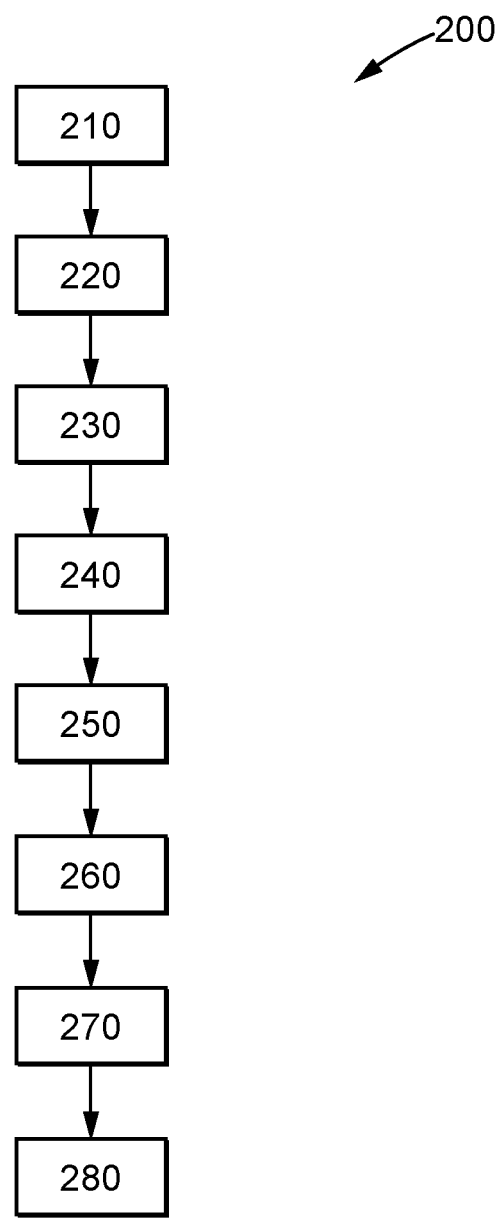
FIG. 7 is a flowchart of a sub-process implemented during a step of the method of FIG. 8.

The method 100 comprises a second step 120 consisting in supplying the third strip 30. FIG. 7 shows a block diagram of a sub-process 200 implemented during the second step 120.

The sub-process 200 comprises a first step 210 consisting in providing a third strip 30 having a planar shape.

The sub-process comprises a second step 220 consisting in forming the bend lines J, M delimiting each first ridge 32a, 38a and second ridge 32b, 38b of the first lateral wall 32 and of the second lateral wall 38 of the third strip 30.

The sub-process comprises a third step 230 consisting in forming a pair K of bend lines K1, K2 on the third strip 30, each pair K of bend lines K1, K2 being associated with a series of tabs 34 each intended to extend into one of the cells formed by the first strip 20 and the second strip 22. In the shown example, two pairs K of bend lines K1, K2 are formed, one of the pairs K being associated with a series of first tabs 34 and the other pair K being associated with a series of second tabs 34.

Each bend line K1, K2 of one of the pairs K delimits, in the second direction A2, one of the end edges of each tab 34 of the associated series of tabs 34. The bend lines K1, K2 of each pair K joining together at each first ridge 32a, 38a of the first lateral wall 32 and of the second lateral wall 38.

When the third strip 30 has a planar shape as visible in FIG. 8, the first lateral wall 32 is arranged between the two pairs K of bend lines K1, K2. Also, the first portion of the second lateral wall 38 is arranged on one side of the pair of bend lines K1, K2 associated with the series of first tabs 34, which is opposite to the first lateral wall 32. Similarly, the second portion of the second lateral wall 38 is arranged on one side of the pair of bend lines associated with the series of second tabs 34, which is opposite to the first lateral wall 32. Remarkably, the first portion and the second portion of the second lateral wall 38 are arranged at opposite end edges of the third strip 30 in a planar configuration.

During the third sub-step 230 of the sub-process 200, the bend line L between each lateral portion 34b and the central portion 34a of each tab 34 is also formed.

The sub-process 200 comprises a fourth step 240 consisting in making a plurality of cutouts in the third strip 30, each cutout forming the passage 36 partially delimited by each tab 34. For example, the fourth step 240 of the sub-process 200 may be carried out by laser.

The sub-process 200 comprises a fifth step 250 consisting in bending the first lateral wall 32 and the second lateral wall 38 so that each has a corrugated shape with an alternation of first ridges 32a, 38a and second ridges 32b, 38b connected by sidewalls 32f, 38f.

Figure 9A:
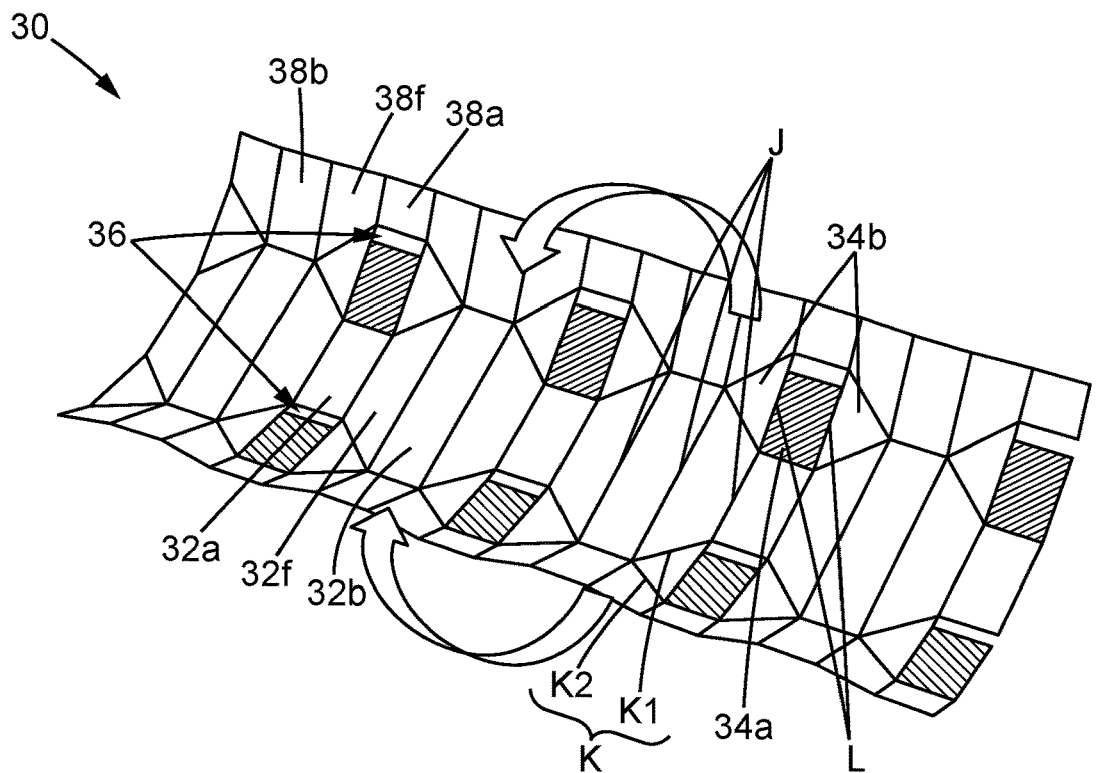
FIG. 9 comprises FIGS. 9A and 9B illustrating different configurations of the third strip of the acoustic panel of FIG. 5 during bending.

The sub-process 200 comprises a sixth step 260, shown in FIG. 9A, consisting in bending each tab 34 with respect to the first lateral wall 32. In particular, each tab 34 may be bent at 90° with respect to the first lateral wall 32.

Figure 9B:
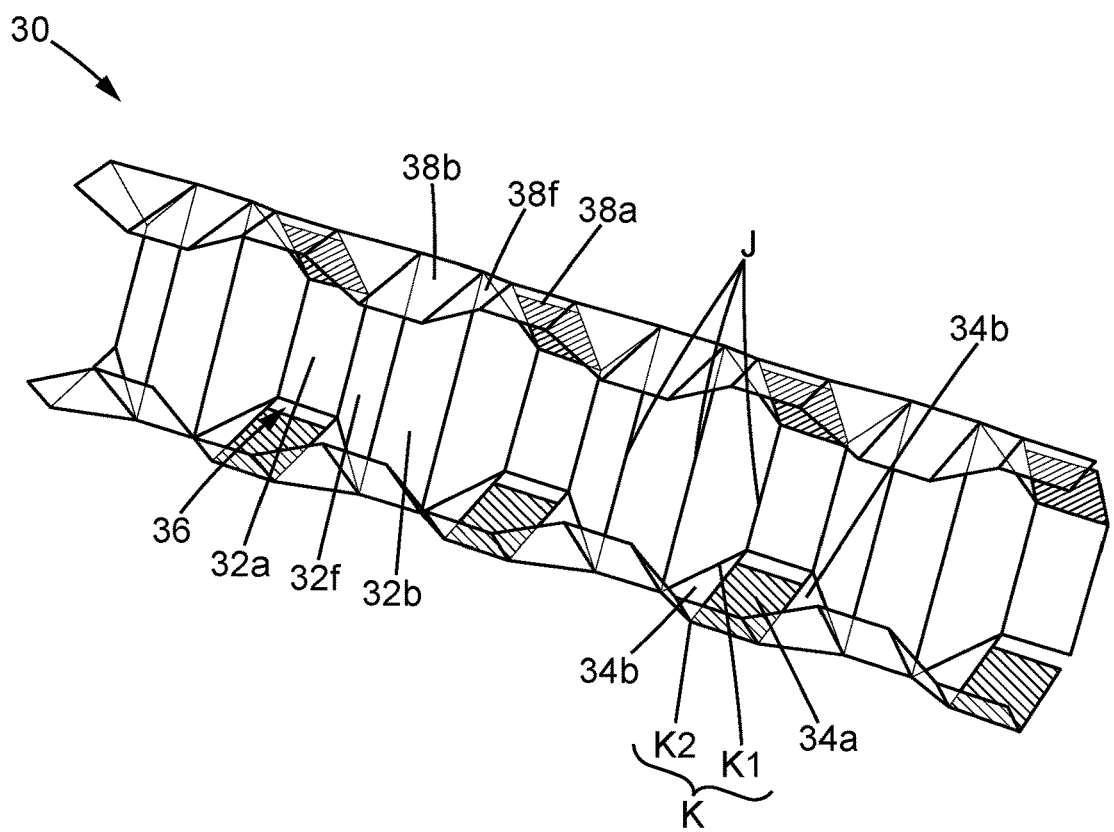

The sub-process 200 comprises a seventh step 270, shown in FIG. 9B, consisting in bending the first portion of the second lateral wall 38 with respect to each first tab 34 and the second portion of the second lateral wall 38 with respect to each second tab 34 so that each second ridge 38b of the second lateral wall 38 is set opposite one of the second ridges 32b of the first lateral wall 32.

The sixth step 260 and the seventh step 270 may be carried out simultaneously.

The fifth step 250, the sixth step 260 and the seventh step 280 of the sub-process 200 may be carried out by a press brake, in particular a manual or automatic type press brake.

The sub-process 200 comprises an eighth step 280 consisting in heating the third strip 30, in particular when the latter is made of a thermosetting material. The third strip 30 may be heated up to a stabilized state in which it is rigid.

The method 100 comprises a third step 130 consisting in positioning the first lateral wall 32 of the third strip 30 bearing on the first strip 20 according to the second direction A2.

The method 100 comprises a fourth step 140 consisting in joining the second strip 22 to the first strip 20 to form a row of cells 18 in the first direction A1, with the third strip 30 interposed, in the second direction A2, between the first strip 20 and the second strip 22, each tab 34 of the third strip 30 extending inside one of the cells 18.

The first step 110 to the fourth step 140 may be repeated N times so as to form N rows of cells 18 according to the second direction A2.

The method 100 comprises a fifth step 150 consisting in heating the acoustic panel 12, in particular when the first strip 20, the second strip 22 and the third strip are made of a thermosetting material. Heating the strips enables a polymerization of the strips enabling fastening of the strips together. Step v may be carried out with the strips arranged on a tooling having a curvature so as to confer a curvature on the strips and therefore on the acoustic panel.

Alternatively, when each first strip 20 and second strip 22 is made of a metallic material, the fifth step 250 may consist in cross-linking an adhesive deposited between each third strip 30 and the adjacent first strip 20 and between each third one and the adjacent second strip 22, for example by heating the formed acoustic panel 12. Thus, the method 100 may comprise a subsidiary step consisting in depositing an adhesive layer over each side of the third strip 30 in the second direction A2. In particular, this subsidiary step may be carried out between the second step 120 and the third step 130.

The invention is not limited to the previously-described examples alone and is open to numerous variants.

According to a variant that is not shown, the passage 36 delimited by each tab 34 is an opening with closed contours formed in the tab 34. Thus, each end edge of each tab 34 is contiguous, in the second direction A2, with one amongst the first ridge 20a of the first strip 20 and the first ridge 22a of the second strip 22 delimiting the associated cell 18.

According to a variant that is not shown, the third strip 30 comprises three tabs 34, or more, extending inside one of the cells 18, transversely to the third direction A3 of the cell 18. The passages 36 totally or partially delimited by two adjacent tabs 34 in the third direction A3 are offset from each other in a direction transverse to the third direction A3.

The invention claimed is:

1. An acoustic panel for a turbine engine, the acoustic panel comprising:
a first strip and a second strip, corrugated, each comprising an alternation, according to a first direction (A1), first ridges and second ridges connected by sidewalls, said first strip and said second strip being joined to each other according to a second direction (A2) transverse to the first direction (A1), so as to form a plurality of cells each delimited, in the second direction (A2), by a first ridge of the first strip and a first ridge of the second strip, each cell extending according to a third direction (A3) transverse to the first direction (A1) and to the second direction (A2), and
a third strip interposed, in the second direction (A2), between the first strip and the second strip, the third strip comprising a first lateral wall bearing, in the second direction (A2), on the first strip, the third strip further comprising at least one tab which extends inside one of the plurality of cells, at least partially transversely to the third direction (A3) of the associated cell, said at least one tab being connected, at a first end edge in the second direction (A2), to the first lateral wall, said at least a tab delimiting all or part of a passage in the third direction (A3) inside the associated cell,
wherein the third strip comprises a plurality of tabs offset from each other in the third direction (A3) of the associated cell, and wherein the passages totally or partially delimited by consecutive first tab and second tab in the third direction (A3) are offset from each other in a direction transverse to the third direction (A3) of the associated cell.

2. The acoustic panel according to claim 1, wherein the passage is delimited by a free edge of the tab and one amongst the first ridge of the first strip and the first ridge of the second strip, delimiting the associated cell.

3. The acoustic panel according to claim 1, wherein the passage is an opening with closed contours formed in the tab.

4. The acoustic panel according to claim 1, wherein each cell has a section transverse to the associated third direction (A3) which is hexagonal, and wherein said at least one tab comprises a central portion which extends, in the second direction (A2), between the first ridges of the first strip and of the second strip, which delimit the associated cell, and two lateral portions each extending, in the second direction (A2), between sidewalls of the first strip and of the second strip, opposite one another in the second direction (A2), which delimit the associated cell.

5. An acoustic panel for a turbine engine, the acoustic panel comprising:
a first strip and a second strip, corrugated, each comprising an alternation, according to a first direction (A1), first ridges and second ridges connected by sidewalls, said first strip and said second strip being joined to each other according to a second direction (A2) transverse to the first direction (A1), so as to form a plurality of cells each delimited, in the second direction (A2), by a first ridge of the first strip and a first ridge of the second strip, each cell extending according to a third direction (A3) transverse to the first direction (A1) and to the second direction (A2), and a third strip interposed, in the second direction (A2), between the first strip and the second strip, the third strip comprising a first lateral wall bearing, in the second direction (A2), on the first strip, the third strip further comprising at least one tab which extends inside one of the plurality of cells, at least partially transversely to the third direction (A3) of the associated cell, said at least one tab being connected, at a first end edge in the second direction (A2), to the first lateral wall, said at least a tab delimiting all or part of a passage in the third direction (A3) inside the associated cell, wherein the first lateral wall of the third strip comprises an alternation, in the first direction (A1), of first ridges and second ridges connected by sidewalls, each first ridge and second ridge of the first lateral wall respectively bearing, in the second direction (A2), on one of the first ridges and one of the second ridges of the first strip.

6. The acoustic panel according to claim 5, wherein the third strip further comprises a second lateral wall bearing, according to the second direction (A2), on the second strip, said at least one tab being connected, at a second end edge in the second direction (A2), to the second lateral wall.

7. The acoustic panel according to claim 6, wherein the second lateral wall of the third strip comprises an alternation, in the first direction (A1), of first ridges and second ridges connected by sidewalls, each first ridge and second ridge of the first lateral wall respectively bearing, in the second direction (A2), on one of the first ridges and one of the second ridges of the second strip,
wherein each second ridge of the second lateral wall of the third strip, is clamped in the second direction (A2) between one of the second ridges of the first strip and one of the second ridges of the second strip.

8. The acoustic panel according to claim 5, wherein each second ridge of the first lateral wall of the third strip is clamped in the second direction (A2) between one of the second ridges of the first strip and one of the second ridges of the second strip.

9. A method for manufacturing an acoustic panel according to claim 1, the method comprising the steps of:
i) providing the corrugated first strip and second strip each comprising the plurality of first ridges and second ridges connected by sidewalls,
ii) providing the third strip comprising said at least one tab,
iii) positioning the first lateral wall of the third strip bearing on the first strip according to the second direction (A2), and
iv) joining the second strip to the first strip to form the plurality of cells, with the third strip interposed, in the second direction (A2), between the first strip and the second strip, said at least one tab extending inside one of the cells, wherein the first strip, the second strip and the third strip are preformed before steps iii) and iv).

10. The manufacturing method according to claim 9, wherein the first lateral wall of the third strip comprises an alternation, in the first direction (A1), of first ridges and second ridges connected by sidewalls, each first ridge and second ridge of the first lateral wall respectively bearing, in the second direction (A2), on one of the first ridges and one of the second ridges of the first strip, the third strip further comprising a second lateral wall bearing, according to the second direction (A2), on the second strip, said at least one tab being connected, at a second end edge in the second direction (A2), to the second lateral wall, wherein step ii includes the subsidiary steps of:

a2) providing a third strip having a planar shape,
b2) forming bend lines that delimit each first ridge and second ridge of the first lateral wall and of the second lateral wall of the third strip,
c2) forming at least one pair of bend lines on the third strip, each of the at least one pair of bend line delimiting one of the end edges in the second direction (A2) of said at least one tab, the at least one pair of bend lines being joined at each first ridge of the first lateral wall and of the second lateral wall,
d2) making a cutout in the third strip configured to form the passage delimited totally or partially by said at least one tab,
e2) bending the first lateral wall and the second lateral wall so that each has a corrugated shape with an alternation of first ridges and second ridges connected by sidewalls,
f2) bending said at least one tab with respect to the first lateral wall, and
g2) bending the second lateral wall with respect to said at least one tab and to the first lateral wall so that each second ridge of the second lateral wall is opposite one of the second ridges of the first lateral wall.

11. The method according to claim 10, wherein steps e2, g2 and f2 are carried out by an automatic press brake.

* * * * *